(12) United States Patent
Su et al.

(10) Patent No.: US 12,177,815 B2
(45) Date of Patent: Dec. 24, 2024

(54) RESOURCE DETERMINATION METHOD AND DEVICE

(71) Applicant: DATANG MOBILE COMMUNICATIONS EQUIPMENT CO., LTD., Beijing (CN)

(72) Inventors: Xin Su, Beijing (CN); Qiubin Gao, Beijing (CN); Xueyuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 403 days.

(21) Appl. No.: 17/628,221

(22) PCT Filed: May 28, 2020

(86) PCT No.: PCT/CN2020/093028
§ 371 (c)(1),
(2) Date: Jan. 19, 2022

(87) PCT Pub. No.: WO2021/017604
PCT Pub. Date: Feb. 4, 2021

(65) Prior Publication Data
US 2022/0256508 A1  Aug. 11, 2022

(30) Foreign Application Priority Data
Jul. 26, 2019  (CN) .......................... 201910682194.0

(51) Int. Cl.
*H04W 72/02*  (2009.01)
*H04L 1/00*  (2006.01)
(Continued)

(52) U.S. Cl.
CPC .......... *H04W 72/02* (2013.01); *H04L 1/0025* (2013.01); *H04W 72/0446* (2013.01); *H04W 72/23* (2023.01)

(58) Field of Classification Search
None
See application file for complete search history.

(56) References Cited

U.S. PATENT DOCUMENTS 11,917,589 B2 *  2/2024  Laddu .................. H04L 5/0044
2014/0044218 A1 *  2/2014  Murakami .......... H04B 7/0465
                                                              375/299

(Continued)

FOREIGN PATENT DOCUMENTS

CN  109392152 A  2/2019
WO  2019068739 A1  4/2019

OTHER PUBLICATIONS

Zte,"Enhancements on multi-TRP/Panel transmission", 3GPP TSG RAN WG1 #96, Athens, Greece, Feb. 25-Mar. 1, 2019, total 19 pages, R1-1901634.
(Continued)

*Primary Examiner* — Lonnie V Sweet
(74) *Attorney, Agent, or Firm* — Kilpatrick Townsend & Stockton LLP

(57) ABSTRACT

Disclosed are a resource determination method and device. On a network side, a resource determination method provided in the embodiments of the present application includes: determining a correlation between a transmission configuration indication (TCI) state and a time domain resource; and determining, according to the correlation, the time domain resource corresponding to the TCI state.

14 Claims, 3 Drawing Sheets

(51) Int. Cl.
*H04W 72/0446* (2023.01)
*H04W 72/23* (2023.01)

(56) References Cited

U.S. PATENT DOCUMENTS

| | | | | |
|---|---|---|---|---|
| 2015/0271003 | A1* | 9/2015 | Kuchi | H04L 1/0656 370/329 |
| 2016/0065341 | A1* | 3/2016 | Yoo | H04L 25/0224 370/336 |
| 2018/0324730 | A1* | 11/2018 | Lee | H04J 11/0069 |
| 2020/0037260 | A1* | 1/2020 | Fu | H04W 52/325 |
| 2020/0351125 | A1* | 11/2020 | Namgoong | H04W 72/04 |
| 2020/0374036 | A1* | 11/2020 | Seo | H04L 5/0094 |
| 2022/0312466 | A1* | 9/2022 | Matsumura | H04L 5/005 |

OTHER PUBLICATIONS

LG Electronics,"Enhancements on multi-TRP/panel transmission", 3GPP TSG RAN WG1 Meeting #96bis, Xi'an,China, Apr. 8-12, 2019, total 14 pages, R1-1904208.

LG Electronics, "Enhancements on multi-TRP/panel transmission", 3GPP TSG RAN WG1 Meeting #97, Reno, USA, May 13-17, 2019, total 11 pages, R1-1906730.

LG Electronics, "Enhancements on multi-TRP/panel transmission", 3GPP TSG RAN WG1 Meeting #96bis, Xi'an, China, Apr. 9-12, 2019, total 14 pages, R1-1904208.

Qualcomm Incorporated,"Multi-TRP Enhancements", 3GPP TSG-RAN WG1 Meeting #97, May 13-17, 2019, Reno, Nevada, USA, total 25 pages, R1-1907289.

Zte,"Maintenance of enhancements on multi-TRP transmission", 3GPP TSG RAN WG1 Meeting #100-e, e-Meeting, Feb. 24-Mar. 6, 2020, total 13 pages, R1-2000239.

Huawei et al.,"Enhancements on Multi TRP/panel transmission", 3GPP TSG RAN WG1 #97, Reno, USA, May 13-17, 2019, total 18 pages, R1-1906029.

Ericsson, "On multi TRP and multi panel", 3GPP TSG RAN WG1 Meeting RAN1#97, Reno, US, May 13-17, 2019, total 23 pages, R1-1907697.

Huawei et al., "Summary of AI: 7.2.8.2 Enhancements on Multi-TRP/Panel Transmission of Offline Discussion", 3GPP TSG RAN WG1 Meeting #97, Reno, USA, May 13-17, 2019, total 66 pages, R1-1907706.

* cited by examiner

RESOURCE DETERMINATION METHOD AND DEVICE

CROSS REFERENCE TO RELATED APPLICATIONS

The present application is a US National Stage of International Application No. PCT/CN2020/093028, filed on May 28, 2020, which claims priority of Chinese patent application with application number 201910682194.0, entitled "Resource Determination Method and Device", filed to China National Intellectual Property Administration on Jul. 26, 2019, the entire contents of which are incorporated herein by reference.

FIELD

The present application relates to the technical field of communication, in particular to a resource determination method and device.

BACKGROUND

A multi transmission reception point (multi-TRP)/panel transmission technology: in order to improve coverage of cell edges and provide the more balanced quality of service within a service area, multi-point cooperation remains an important technology in a new radio (NR) system. From the perspective of network forms, network deployment is carried out in a manner of massive distributed access points and baseband centralized processing, which is more beneficial to providing a balanced user experience rate, and remarkably reducing time delay and signaling overhead which are caused by handover. As frequency bands rise, relatively dense access point deployment is also required from the perspective of ensuring network coverage. At a high frequency band, along with improvement of the integration level of active antenna equipment, a modularized active antenna array is more likely to be adopted. An antenna array of each TRP may be divided into relatively independent antenna panels, and the form and the number of ports of a whole array plane can be flexibly adjusted according to deployment scenes and service requirements. The antenna panels or the TRPs may also be connected through optical fibers, and more flexible distributed deployment can be carried out. In a millimeter wave band, as the wavelength decreases, a blocking effect generated by obstacles such as a human body or a vehicle is more remarkable. In this case, from the perspective of guaranteeing link connection robustness, it is also possible to utilize cooperation between TRPs or panels to transmit/receive from beams at multiple angles, to reduce adverse effects caused by the blocking effect.

An ultra-reliable and low latency communication (URLLC) enhancement scheme based on coordinated multiple points transmission/reception (CoMP): in the prior art, the possibly adopted URLLC enhancement scheme based on CoMP includes the following schemes.

Scheme 1 (space division multiplexing (SDM)): on overlapped time frequency resources in a slot, each transmission occasion (actually referring to a signal transmitted by one TRP on one resource) corresponds to an associated transmission configuration indication (TCI) state and a set of data layers of a set of demodulation reference signal (DMRS) ports.

Scheme 2 (frequency division multiplexing (FDM)): in a slot, each of frequency domain resources is associated with a TCI state, and the various frequency domain resources are not overlapped.

Scheme 3 (time division multiplexing (TDM) in a mini-slot level: in a slot, each of time domain resources is associated with one TCI state, and the various time domain resources are not overlapped. One time domain resource refers to one set of mini slot (each set may have only one mini slot).

Scheme 4 (TDM in a slot level): each of time domain resources is associated to one TCI state, and the various time domain resources are not overlapped. One time domain resource refers to one set of slot (each set may have only one slot).

The foregoing schemes may further be combined, for example, a FDM+TDM mode.

Physical Resource Block (PRB) Bundling.

For transmission based on transparent DMRS, the same precoding mode is adopted for DMRS and data. In this case, a contradiction exists between the performance of frequency selective precoding and channel estimation accuracy. In order to obtain the performance gain of joint channel estimation of multiple PRBs, the granularity of the frequency selective precoding is limited, and the precoding gain is reduced. Conversely, if each PRB is independently precoded in order to guarantee the gain of the frequency selective precoding, joint channel estimation cannot be carried out.

For solving the above problems, different schemes for a frequency division duplex (FDD) system and a time division duplex (TDD) system are adopted in long term evolution (LTE).

For a system configured with precoding matrix indicator (PMI) feedback, performance gain of frequency selective precoding is not obvious because PMI/rank indicator (RI) is just coarse quantization of a channel. However, joint channel estimation can directly improve the channel estimation performance and improve the reception quality of a link. Thus, a PRB bundling mode is adopted for an FDD system, that is, user equipment (UE) may assume that precoding of a physical downlink shared channel (PDSCH) is kept unchanged on continuous PRBs. The specific size of PRB bundling depends on system bandwidth, as shown in Table 1 below.

TABLE 1

Size of Bundling of an LTE System

| (System Bandwidth (#PRB)) | Precoding Resource block Group (PRG) Size (PRB) |
|---|---|
| ≤10 | 1 |
| 11-26 | 2 |
| 27-63 | 3 |
| 64-110 | 2 |

For a system configured with non-PMI feedback, a base station (eNB) may utilize channel reciprocity to obtain more accurate channel state information. Therefore, frequency selective precoding has more important significance for link performance relative to an FDD system. In this case, a gain resulting from supporting joint channel estimation between PRBs through joint precoding of multiple PRBs cannot compensate for the precoding gain loss caused therefrom. Based on the above considerations, PRB bundling will not be applicable when non-PMI feedback is configured. At the moment, the UE assumes that each scheduled PRB uses an independent precoding mode, and joint channel estimation cannot be carried out.

In unicast transmission in a NR system, in order to optimize transmission for different system bandwidths, a bundling mode for supporting dynamic PRG indication is adopted, the following scheme is adopted.

If a dynamic indication function is turned off by radio resource control (RRC), a PRG size configured by a higher layer is used.

In addition, for fallback transmission, a default PRG size (2 PRBs) is also used.

If a dynamic indication function is turned on by RRC, an PRG size (selected from 2, 4 and a continuous scheduled bandwidth) is configured by RRC according to one embodiment, and the specific PRG size is determined by downlink control signaling (DCI format 1_1).

To maintain sufficient flexibility, RRC may be configured with two parameter sets.

A set 1 contains one or two values of PRG size. When one value is contained, the one value may be configured to be 2, 4 or the continuous scheduled bandwidth; and when two values are contained, the two values may be configured to be {2, the continuous scheduled bandwidth} or {4, the continuous scheduled bandwidth}.

A set 2 contains only one value, which can be configured to be 2, 4 or a continuous scheduled bandwidth.

When an indicator field of the PRG size in downlink control information (DCI) is set to 1, the used PRG size is chosen from the set 1. In the case that the set 1 contains two PRG sizes: if the number of scheduled PRBs exceeds half of bandwidth of bandwidth part (BWP), the PRG size is the continuous scheduled bandwidth; and conversely, the PRG size is 2 or 4.

When the indicator field of the PRG size in DCI is set to 0, the PRG size in the set 2 is used.

If the PRG size is "continuous scheduled bandwidth", a terminal cannot be allocated with non-continuous frequency domain resources.

In conclusion, currently, for the above scheme 3/4 (TDM mode), improvement of channel estimation performance through time domain joint detection is not considered.

SUMMARY

Embodiments of the present application provide a resource determination method and device, which are used for determining a time domain resource corresponding to a TCI state according to a correspondence between the TCI state and the time domain resource.

At a network side, an embodiment of the present application provides a resource determination method, including: determining a correspondence between a TCI state and a time domain resource; and determining, according to the correspondence, the time domain resource corresponding to the TCI state.

In one embodiment, the time domain resource corresponding to the TCI state is determined by adopting one of: a mode 1-1: determining the time domain resource corresponding to the TCI state by a bitmap mode; a mode 1-2: determining the time domain resource corresponding to the TCI state by a predefined pattern; a mode 1-3: determining the time domain resource corresponding to the TCI state by a predefined rule; or a mode 1-4: determining the time domain resource corresponding to the TCI state by the number of continuous mini slots or slots corresponding to the TCI state.

In one embodiment, when the time domain resource corresponding to the TCI state is determined by the mode 1-2, the method further includes: informing a terminal of pattern indication information.

At a terminal side, an embodiment of the present application provides a resource determination method, including: determining, a correspondence between a TCI state and a time domain resource, the time domain resource corresponding to the TCI state; and determining, according to the time domain resource corresponding to the TCI state, a size of time domain bundling.

In one embodiment, the time domain resource corresponding to the TCI state is determined by adopting one of: a mode 1-1: determining the time domain resource corresponding to the TCI state by a bitmap mode; a mode 1-2: determining the time domain resource corresponding to the TCI state by a predefined pattern and pattern indication information informed by the network side; a mode 1-3: determining the time domain resource corresponding to the TCI state by a predefined rule; or a mode 1-4: determining the time domain resource corresponding to the TCI state by the number of continuous mini slots or slots corresponding to the TCI state.

In one embodiment, the determining, according to the time domain resource corresponding to the TCI state, the size of the time domain bundling specifically includes one of: a mode 2-1: predetermining a maximum value M_max of the size M of the time domain bundling, where if the number of mini slots or slots on a section of continuous mini slots or slots corresponding to the TCI state is P and P≤M_max, M=P; and if P>M_max, M=M_max; or a mode 2-2: assigning the maximum value M_max of the size M of the time domain bundling by the network side, where if the number of mini slots or slots on a section of continuous mini slots or slots corresponding to the TCI state is P and P≤M_max, M=P; and if P>M_max, the M=M_max.

In one embodiment, a precoding mode used on the time domain resource within the size of the time domain bundling is kept unchanged.

At the network side, an embodiment of the present application provides a resource determination device, including: a memory, configured to store a program instruction; and a processor, configured to call the program instruction stored in the memory, and execute the following operations according to an obtained program: determining a correspondence between a TCI state and a time domain resource; and determining, according to the correspondence, the time domain resource corresponding to the TCI state.

In one embodiment, the processor is configured to determine the time domain resource corresponding to the TCI state by adopting one of: a mode 1-1: determining the time domain resource corresponding to the TCI state by a bitmap mode; a mode 1-2: determining the time domain resource corresponding to the TCI state by a predefined pattern; a mode 1-3: determining the time domain resource corresponding to the TCI state by a predefined rule; or a mode 1-4: determining the time domain resource corresponding to the TCI state by the number of continuous mini slots or slots corresponding to the TCI state.

In one embodiment, when the time domain resource corresponding to the TCI state is determined by the mode 1-2, the processor is further configured to call the program instruction stored in the memory, and execute informing a terminal of pattern indication information according to an obtained program.

At the terminal side, an embodiment of the present application provides a resource determination device, including: a memory, configured to store a program instruction; and a processor, configured to call the program instruction stored in the memory, and execute the following operations according to an obtained program: determining, according to a correspondence between a TCI state and a time domain resource, the time domain resource corresponding to the TCI state; and determining, according to the time domain resource corresponding to the TCI state, a size of time domain bundling.

In one embodiment, the processor is configured to determine the time domain resource corresponding to the TCI state by adopting one of: a mode 1-1: determining the time domain resource corresponding to the TCI state by a bitmap mode; a mode 1-2: determining the time domain resource corresponding to the TCI state by a predefined pattern and pattern indication information informed by the network side; a mode 1-3: determining the time domain resource corresponding to the TCI state by a predefined rule; or a mode 1-4: determining the time domain resource corresponding to the TCI state by the number of continuous mini slots or slots corresponding to the TCI state.

In one embodiment, the determining, according to the time domain resource corresponding to the TCI state, the size of the time domain bundling specifically includes one of: a mode 2-1: predetermining a maximum value M_max of the size M of the time domain bundling, where if the number of mini slots or slots on a section of continuous mini slots or slots corresponding to the TCI state is P and P≤M_max, M=P; and if P>M_max, M=M_max; or a mode 2-2: assigning the maximum value M_max of the size M of the time domain bundling by the network side, where if the number of mini slots or slots on a section of continuous mini slots or slots corresponding to the TCI state is P and P≤M_max, M=P; and if P>M_max, M=M_max.

In one embodiment, a precoding mode used on the time domain resource within the size of the time domain bundling is kept unchanged.

At the network side, an embodiment of the present application provides another resource determination device, including: a first determination device, configured to determine a correspondence between a TCI state and a time domain resource; and a second determination device, configured to determine, according to the correspondence, the time domain resource corresponding to the TCI state.

In one embodiment, the second determination device is configured to determine the time domain resource corresponding to the TCI state by adopting one of: a mode 1-1: determining the time domain resource corresponding to the TCI state by a bitmap mode; a mode 1-2: determining the time domain resource corresponding to the TCI state by a predefined pattern; a mode 1-3: determining the time domain resource corresponding to the TCI state by a predefined rule; or a mode 1-4: determining the time domain resource corresponding to the TCI state by the number of continuous mini slots or slots corresponding to the TCI state.

In one embodiment, when the time domain resource corresponding to the TCI state is determined by the mode 1-2, the second determination device is further configured to: inform a terminal of pattern indication information.

At the terminal side, an embodiment of the present application provides another resource determination device, including: a first device, configured to determine, according to a TCI state and a time domain resource, the time domain resource corresponding to the TCI state; and a second device, configured to determine, according to the time domain resource corresponding to the TCI state, a size of time domain bundling.

In one embodiment, the first device is configured to determine the time domain resource corresponding to the TCI state by adopting one of: a mode 1-1: determining the time domain resource corresponding to the TCI state by a bitmap mode; a mode 1-2: determining the time domain resource corresponding to the TCI state by a predefined pattern and pattern indication information informed by the network side; a mode 1-3: determining the time domain resource corresponding to the TCI state by a predefined rule; or a mode 1-4: determining the time domain resource corresponding to the TCI state by the number of continuous mini slots or slots corresponding to the TCI state.

In one embodiment, the determining, according to the time domain resource corresponding to the TCI state, the size of the time domain bundling specifically includes one of: a mode 2-1: predetermining a maximum value M_max of the size M of the time domain bundling, where if the number of mini slots or slots on a section of continuous mini slots or slots corresponding to the TCI state is P and P≤M_max, M=P; and if P>M_max, M=M_max; or a mode 2-2: assigning the maximum value M_max of the size M of the time domain bundling by the network side, where if the number of mini slots or slots on a section of continuous mini slots or slots corresponding to the TCI state is P and P≤M_max, M=P; and if P>M_max, M=M_max.

In one embodiment, a precoding mode used on the time domain resource within the size of the time domain bundling is kept unchanged.

Another embodiment of the present application provides computing equipment, which includes a memory and a processor, where the memory is configured to store a program instruction, and the processor is configured to call the program instruction stored in the memory, and execute any one of the foregoing resource determination methods according to an obtained program.

Another embodiment of the present application provides a computer storage medium, the computer storage medium stores a computer executable instruction, and the computer executable instruction is configured to enable a computer to execute any one of the foregoing resource determination methods.

BRIEF DESCRIPTION OF THE DRAWINGS

In order to more clearly illustrate the embodiments of the present application, the drawings to be used in the description of the embodiments are briefly introduced below, the drawings in the following description are only some embodiments of the present application, and other drawings may be obtained.

DETAILED DESCRIPTION OF THE EMBODIMENTS

Figure 1:
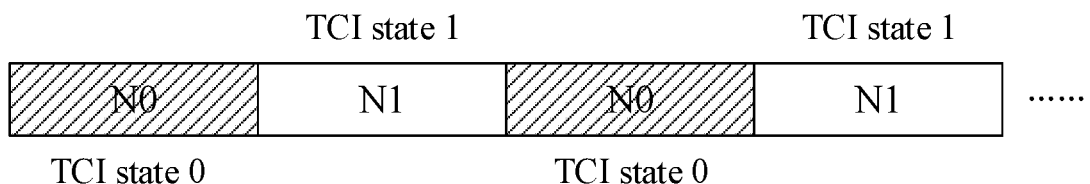
FIG. 1 is a schematic diagram illustrating that TCI states alternately correspond to N0 mini slots or slots and N1 mini slots or slots provided by an embodiment of the present application.

The embodiments of the present application will be clearly and completely described below in the combination with the drawings in the embodiments of the present application. The described embodiments are only some embodiments of the present application, and not all embodiments. All other embodiments based on the embodiments in the present application fall within the scope of protection of the present application.

Embodiments of the present application provide a resource determination method and device, which are used for determining a time domain resource corresponding to a TCI state according to a correspondence between the TCI state and the time domain resource.

The method and the device are based on the same application concept, and because the principles of the method and the device for solving the problems are similar, implementations of the device and the method may refer to each other, and repeated parts are not described again.

The embodiments of the present application may be suitable for various systems, especially a 5G system. For example, applicable systems may be a global system of mobile communication (GSM), a code division multiple access (CDMA) system, a wideband code division multiple access (WCDMA) general packet radio service (GPRS) system, an LTE system, an LTE FDD system, an LTE TDD system, a universal mobile telecommunication system (UMTS), a worldwide interoperability for microwave access (WiMAX) system, a 5G system, a 5G NR system and the like. Each of the various systems includes terminal equipment and network equipment.

Terminal equipment involved in the embodiments of the present application may be equipment providing voice and/or data connectivity to a user, handheld equipment having a wireless connection function, or other processing equipment connected to a wireless modem. In different systems, the names of the terminal equipment may also be different, for example, in a 5G system, the terminal equipment may be referred to as UE. Wireless terminal equipment may communicate with one or more core networks via a wireless access network (RAN), and may be mobile terminal equipment such as a mobile phone (or called a cell phone) and a computer having mobile terminal equipment, for example, may be portable, pocket type, hand-held, computer-embedded or vehicle-mounted mobile device; and the wireless terminal equipment exchanges languages and/or data with a wireless access network. For example, the equipment may be a personal communication service (PCS) phone, a cordless phone, a session initiated protocol (SIP) phone, a wireless local loop (WLL) station, a personal digital assistance (PDA) and the like. The wireless terminal equipment may also be called a system, a subscriber device, a subscriber station, a mobile station, a mobile station, a remote station, an access point, a remote terminal, an access terminal, a user terminal, a user agent or a user device, which is not limited in the embodiments of the present application.

Network equipment involved in the embodiments of the present application may be a base station, and the base station may include cells. A base station may also be referred to as an access point or as equipment which communicates with wireless terminal equipment, through one or more sectors over an air interface in an access network, or by other names, according to different specific application scenarios. The network equipment may be configured to interconvert received air frames and internet protocol (IP) packets to serve as a router between the wireless terminal equipment and the rest of the access network, where the rest of the access network may include an IP communication network. The network equipment may also coordinate attribute management for the air interface. For example, the network equipment involved in the embodiments of the present application may be a base transceiver station (BTS) in a GSM or a CDMA, may also be NodeB in a WCDMA, may further be evolutional node B (eNB or e-NodeB) in an LTE system, a 5G base station in a 5G network architecture (next generation system), a home evolved node B (HeNB), a relay node, a femto, a pico, and the like, which is not limited in the embodiments of the present application.

Various embodiments of the present application will be described in detail below in combination with the drawings of the specification. It should be noted that the display sequence in the embodiments of the present application only represents the sequence of the embodiments, and does not represent the superiority and inferiority of the embodiments.

The embodiments of the present application utilize TDM to enhance coordinated transmission reliability of multi-TRP, and further, to improve channel estimation performance.

In the embodiments of the present application, it is assumed that a network side indicates or configures a time domain repetition number to be N; for the scheme 3, N mini slots are present correspondingly; and for the scheme 4, N slots are present correspondingly, and N is a natural number.

For example, in the embodiments of the present application, a correspondence between a TCI state and a time domain resource are as follows.

A mode 1-1: a time domain resource corresponding to each TCI state is determined by a bitmap mode.

A TCI state corresponding to each mini slot or slot is determined by utilizing a bitmap with a length of N. For example, when N=4, {0,0,1,1} represents that on four mini slots or slots which are transmitted repeatedly, the sequence formed by the corresponding TCI states is {TCI state 0, TCI state 0, TCI state 1, TCI state 1}.

A mode 1-2: the time domain resource corresponding to each TCI state is determined by a predefined pattern and corresponding pattern indication information.

Patterns are predefined, and separately correspond to different sequences of TCI states. Meanwhile, the respective sequences of TCI states have a corresponding index. For example, when N=4:

the sequence of TCI states corresponding to index 0 is {TCI state 0, TCI state 0, TCI state 0, TCI state 0};

the sequence of TCI states corresponding to index 1 is {TCI state 0, TCI state 0, TCI state 0, TCI state 1};

the sequence of TCI states corresponding to index 2 is {TCI state 0, TCI state 0, TCI state 1, TCI state 0};

the sequence of TCI states corresponding to index 3 is {TCI state 0, TCI state 0, TCI state 1, TCI state 1};

the sequence of TCI states corresponding to index 4 is {TCI state 0, TCI state 1, TCI state 0, TCI state 0};

the sequence of TCI states corresponding to index 5 is {TCI state 0, TCI state 1, TCI state 0, TCI state 1};

the sequence of TCI states corresponding to index 6 is {TCI state 0, TCI state 1, TCI state 1, TCI state 0};

the sequence of TCI states corresponding to index 7 is {TCI state 0, TCI state 1, TCI state 1, TCI state 1};

the sequence of TCI states corresponding to index 8 is {TCI state 1, TCI state 0, TCI state 0, TCI state 0};
the sequence of TCI states corresponding to index 9 is {TCI state 1, TCI state 0, TCI state 0, TCI state 1};
the sequence of TCI states corresponding to index 10 is {TCI state 1, TCI state 0, TCI state 1, TCI state 0};
the sequence of TCI states corresponding to index 11 is {TCI state 1, TCI state 0, TCI state 1, TCI state 1};
the sequence of TCI states corresponding to index 12 is {TCI state 1, TCI state 1, TCI state 0, TCI state 0};
the sequence of TCI states corresponding to index 13 is {TCI state 1, TCI state 1, TCI state 0, TCI state 1};
the sequence of TCI states corresponding to index 14 is {TCI state 1, TCI state 1, TCI state 1, TCI state 0}; and
the sequence of TCI states corresponding to index 15 is {TCI state 1, TCI state 1, TCI state 1, TCI state 1}.

After the repetition number N is determined, the network side may indicate the sequence of TCI states through an index value, and a correspondence between a TCI state and each mini slot or slot is determined.

A mode 1-3: the time domain resource corresponding to each TCI state is determined by a predefined rule.

A resource corresponding to each TCI state may be predetermined. For example: it may be predetermined that a TCI state 0 corresponds to even numbered mini slots or slots, and a TCI state 1 corresponds to odd numbered mini slots or slots; and it may be predetermined that a TCI state 0 corresponds to the first half of mini slots or slots, and a TCI state 1 corresponds to the second half of mini slots or slots.

After the repetition number N is determined, the network side may determine a correspondence between a TCI state and each mini slot or slot by the foregoing predetermination.

A mode 1-4: the time domain resource corresponding to each TCI state is determined by the number of continuous mini slots or slots corresponding to the TCI state.

The network side may assign that the maximum number of continuous mini slots or slots corresponding to a TCI state 0 are N0, and assign that the maximum number of continuous mini slots or slots corresponding to a TCI state 1 are N1.

The all TCI states may alternately correspond to N0 mini slots or slots or N1 mini slots or slots, referring to FIG. 1, for example: the first N0 mini slots or slots in N mini slots or slots correspond to a TCI state 0; if mod(N,N0+N1)≥0, (N0+1) to (N0+N1) mini slots or slots correspond to a TCI state 1; if mod(N,2*N0+N1)≥0, (N0+N1+1) to (2*N0+N1) mini slots or slots correspond to a TCI state 0; etc.

According to the above examples, if mod(N,N0+N1)=0, the first N0 mini slots or slots in the N mini slots or slots correspond to a TCI state 0, while the last N1 mini slots or slots correspond to a TCI state 1. If N/(N0+N1) is greater than 1, on the remaining mini slots or slots, TCI states are alternately mapped onto the N0 mini slots or slots or N1 mini slots or slots.

If 0<mod(N,N0+N1)≤N0, the first N0 mini slots or slots in the N mini slots or slots correspond to a TCI state 0, while the last mod(N,N0+N1) mini slots or slots correspond to a TCI state 0. On the remaining mini slots or slots, TCI states are alternately mapped onto N0 mini slots or slots or N1 mini slots or slots.

If N0<mod(N,N0+N1)<N0+N1, the first N0 mini slots or slots in the N mini slots or slots correspond to a TCI state 0, while the last mod(N,N0+N1) mini slots or slots correspond to a TCI state 1. On the remaining mini slots or slots, TCI states are alternately mapped onto N0 mini slots or slots or N1 mini slots or slots.

Determination of a Size of Time Domain Bundling at a Terminal Side.

It is assumed that precoding of a terminal is kept unchanged (and joint channel estimation may be performed) in continuous M (size of time domain bundling) mini slots or slots, and the value of M may be determined in the following modes.

A mode 2-1: a maximum value M_max of M is predetermined, for example, the number of mini slots or slots on a section of continuous mini slots or slots corresponding to any one of TCI stats equals to P, and P≤M_max, then M=P; and if P>M_max, M=M_max.

A mode 2-2: the network side assigns that the maximum value of M is M_max, for example, if the number of mini slots or slots on a section of continuous mini slots or slots corresponding to a one TCI state equals to P, and P≤M_max, then M=P; and if P>M_max, M=M_max.

Figure 2:
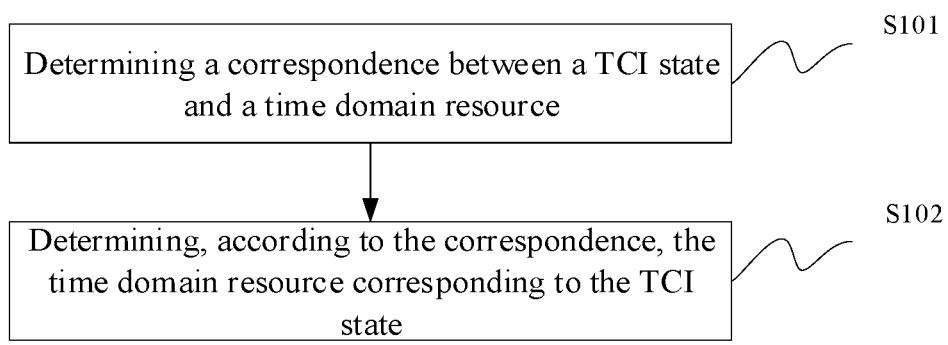
FIG. 2 is a flow diagram of a resource determination method at a network side provided by an embodiment of the present application.

In conclusion, at the network side, referring to FIG. 2, an embodiment of the present application provides a resource determination method, including the following.

S101, determining a correspondence between a TCI state and a time domain resource.

S102, determining, according to the correspondence, the time domain resource corresponding to the TCI state.

In one embodiment, the time domain resource corresponding to the TCI state is determined by adopting one of the following modes:
 a mode 1-1: the time domain resource corresponding to the TCI state is determined by a bitmap mode;
 a mode 1-2: the time domain resource corresponding to the TCI state is determined by a predefined pattern;
 a mode 1-3: the time domain resource corresponding to the TCI state is determined by a predefined rule; or
 a mode 1-4: the time domain resource corresponding to the TCI state is determined by the number of continuous mini slots or slots corresponding to the TCI state.

In one embodiment, when the time domain resource corresponding to the TCI state is determined by the mode 1-2, the method further includes: informing a terminal of pattern indication information.

Figure 3:
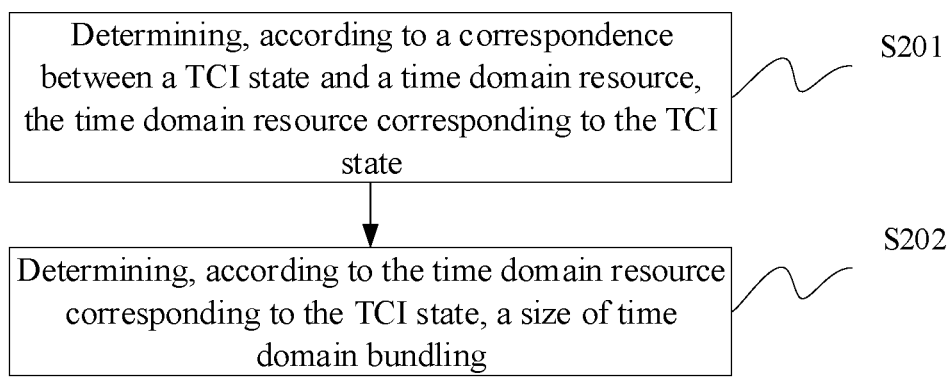
FIG. 3 is a flow diagram of a resource determination method at a terminal side provided by an embodiment of the present application.

Correspondingly, at the terminal side, referring to FIG. 3, an embodiment of the present application provides a resource determination method, including the following.

S201, determining, according to a correspondence between a TCI state and a time domain resource, the time domain resource corresponding to the TCI state.

S202, determining, according to the time domain resource corresponding to the TCI state, a size of time domain bundling.

In one embodiment, the time domain resource corresponding to the TCI state is determined by adopting one of the following modes:
 a mode 1-1: the time domain resource corresponding to the TCI state is determined by a bitmap mode;
 a mode 1-2: the time domain resource corresponding to the TCI state is determined by a predefined pattern and pattern indication information informed by the network side;
 a mode 1-3: the time domain resource corresponding to the TCI state is determined by a predefined rule; or
 a mode 1-4: the time domain resource corresponding to the TCI state is determined by the number of continuous mini slots or slots corresponding to the TCI state.

In one embodiment, the determining, according to the time domain resource corresponding to the TCI state, the size of time domain bundling specifically includes one of the following modes:

a mode 2-1: a maximum value M_max of the size M of the time domain bundling is predetermined; if the number of mini slots or slots on a section of continuous mini slots or slots corresponding to the TCI state is P and P≤M_max, M=P; and if P>M_max, M=M_max; or a mode 2-2: a network side assigns the maximum value M_max of the size M of the time domain bundling; if the number of mini slots or slots on a section of continuous mini slots or slots corresponding to the TCI state is P and P≤M_max, M=P; and if P>M_max, M=M_max.

In one embodiment, a precoding mode used on the time domain resource within the size of the time domain bundling is kept unchanged.

Figure 4:
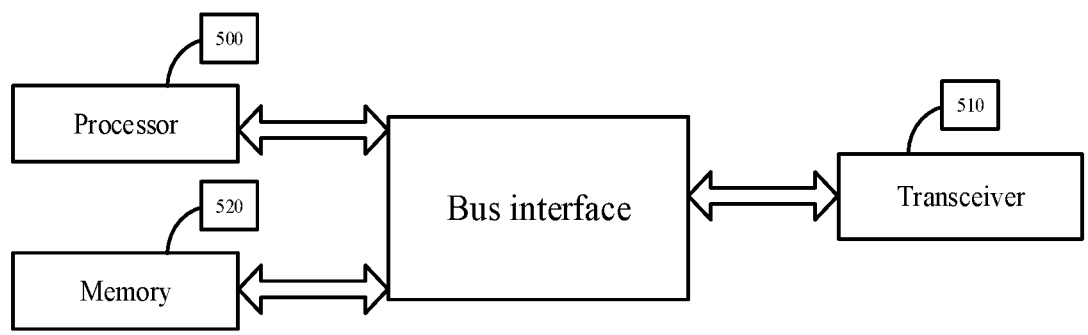
FIG. 4 is a schematic structural diagram of a resource determination device at the network side provided by an embodiment of the present application.

Correspondingly, at the network side, referring to FIG. 4, an embodiment of the present application provides a resource determination device, including:

a memory 520, configured to store a program instruction; and a processor, configured to call the program instruction stored in the memory, and execute the following operations according to an obtained program:

determining a correspondence between a TCI state and a time domain resource; and determining, according to the correspondence, the time domain resource corresponding to the TCI state.

In one embodiment, the processor 500 is configured to determine the time domain resource corresponding to the TCI state by adopting one of the following modes:

a mode 1-1: the time domain resource corresponding to the TCI state is determined by a bitmap mode;

a mode 1-2: the time domain resource corresponding to the TCI state is determined by a predefined pattern;

a mode 1-3: the time domain resource corresponding to the TCI state is determined by a predefined rule; or a mode 1-4: the time domain resource corresponding to the TCI state is determined by the number of continuous mini slots or slots corresponding to the TCI state.

In one embodiment, when the time domain resource corresponding to the TCI state is determined by the mode 1-2, the processor 500 is further configured to call the program instruction stored in the memory, and execute informing a terminal of pattern indication information according to an obtained program.

A transceiver 510 is configured to receive and transmit data under the control of the processor 500.

In FIG. 4, a bus architecture may include any number of buses and bridges which are interconnected, and specifically, link one or more processors represented by the processor 500, memories represented by the memory 520, and other various circuits together. The bus architecture may also link peripherals, voltage regulators, power management circuits and other various circuits together, which is well known in the art, and therefore, it will not be described any further herein. A bus interface provides an interface. The transceiver 510 may be multiple elements, including a transmitter and a transceiver, and providing a device for communicating with various other devices over a transmission medium. The processor 500 is responsible for managing the bus architecture and processing in general, and the memory 520 may store data used by the processor 500 when executing operations.

The processor 500 may be a central processing unit (CPU), an application specific integrated circuit (ASIC), a field-programmable gate array (FPGA) or a complex programmable logic device (CPLD).

Figure 5:
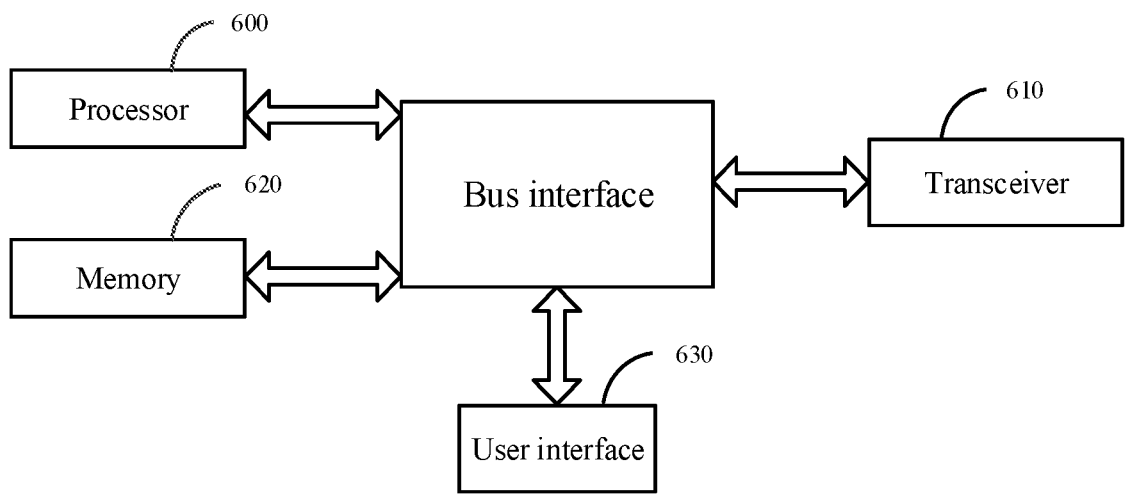
FIG. 5 is a schematic structural diagram of a resource determination device at the terminal side provided by an embodiment of the present application.

Correspondingly, at the terminal side, referring to FIG. 5, an embodiment of the present application provides a resource determination device, including:

a memory 620, configured to store a program instruction; and a processor 600, configured to call the program instruction stored in the memory, and execute the following operations according to an obtained program:

determining, according to a correspondence between a TCI state and a time domain resource, the time domain resource corresponding to the TCI state; and determining, according to the time domain resource corresponding to the TCI state, a size of time domain bundling.

In one embodiment, the processor 600 is configured to determine the time domain resource corresponding to the TCI state by adopting one of the following modes:

a mode 1-1: the time domain resource corresponding to the TCI state is determined by a bitmap mode;

a mode 1-2: the time domain resource corresponding to the TCI state is determined by a predefined pattern and pattern indication information informed by the network side;

a mode 1-3: the time domain resource corresponding to the TCI state is determined by a predefined rule; or a mode 1-4: the time domain resource corresponding to the TCI state is determined by the number of continuous mini slots or slots corresponding to the TCI state.

In one embodiment, the determining, according to the time domain resource corresponding to the TCI state, the size of the time domain bundling specifically includes one of the following modes:

a mode 2-1: a maximum value M_max of the size M of the time domain bundling is predetermined; if the number of mini slots or slots on a section of continuous mini slots or slots corresponding to the TCI state is P and P≤M_max, M=P; and if P>M_max, M=M_max; or a mode 2-2: the network side assigns the maximum value M_max of the size M of the time domain bundling; if the number of mini slots or slots on a section of continuous mini slots or slots corresponding to the TCI state is P and P≤M_max, M=P; and if P>M_max, M=M_max.

In one embodiment, a precoding mode used on the time domain resource within the size of the time domain bundling is kept unchanged.

A transceiver 610 is configured to receive and transmit data under the control of the processor 600.

In FIG. 5, a bus architecture may include any number of buses and bridges which are interconnected, and specifically, link one or more processors represented by the processor 600, memories represented by the memory 620, and other various circuits together. The bus architecture may also link peripherals, voltage regulators, power management circuits and other various circuits together, which is well known in the art, and therefore, it will not be described any further herein. A bus interface provides an interface. The transceiver 610 may be multiple elements, including a transmitter and a receiver, and providing a device for communicating with various other devices over a transmission medium. For different user equipment, a user interface 630 may also be an interface which can be externally or internally connected to required equipment including, but not limited to, a keypad, a display, a speaker, a microphone, a joystick, etc.

The processor 600 is responsible for managing the bus architecture and processing in general, and the memory 620 may store data used by the processor 600 when executing operations.

In one embodiment, the processor 600 may be a CPU, an ASIC, a FPGA or a CPLD.

Figure 6:
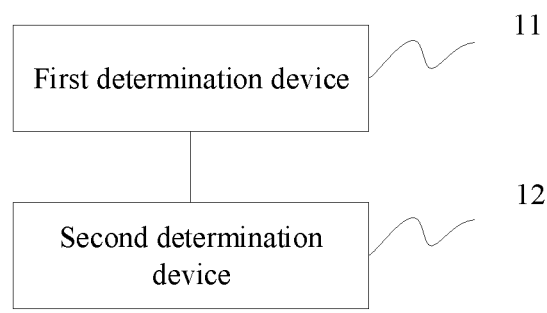
FIG. 6 is a schematic structural diagram of another resource determination device at the network side provided by an embodiment of the present application.

At the network side, referring to FIG. 6, an embodiment of the present application provides another resource determination device, including:

a first determination device 11, configured to determine a correspondence between a TCI state and a time domain resource; and a second determination device 12, configured to determine, according to the correspondence, the time domain resource corresponding to the TCI state.

In one embodiment, the second determination device 12 is configured to determine the time domain resource corresponding to the TCI state by adopting one of the following modes:

a mode 1-1: the time domain resource corresponding to the TCI state is determined by a bitmap mode;

a mode 1-2: the time domain resource corresponding to the TCI state is determined by a predefined pattern;

a mode 1-3: the time domain resource corresponding to the TCI state is determined by a predefined rule; or a mode 1-4: the time domain resource corresponding to the TCI state is determined by the number of continuous mini slots or slots corresponding to the TCI state.

In one embodiment, when the time domain resource corresponding to the TCI state is determined by the mode 1-2, the second determination device 12 is further configured to inform a terminal of pattern indication information.

Figure 7:
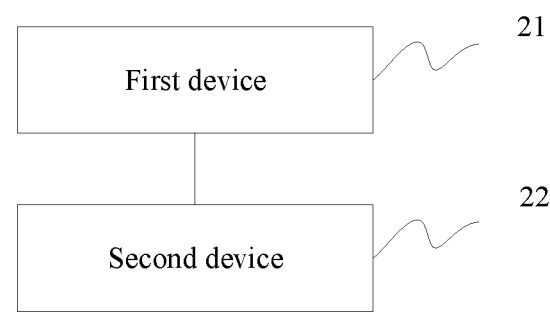
FIG. 7 is a schematic structural diagram of another resource determination device at the terminal side provided by an embodiment of the present application.

At the terminal side, referring to FIG. 7, an embodiment of the present application provides another resource determination device, including:

a first device 21, configured to determine, according to a correspondence between a TCI state and a time domain resource, the time domain resource corresponding to the TCI state; and a second device 22, configured to determine, according to the time domain resource corresponding to the TCI state, a size of time domain bundling.

In one embodiment, the first device 21 is configured to determine the time domain resource corresponding to the TCI state by adopting one of the following modes:

a mode 1-1: the time domain resource corresponding to the TCI state is determined by a bitmap mode;

a mode 1-2: the time domain resource corresponding to the TCI state is determined by a predefined pattern and pattern indication information informed by the network side;

a mode 1-3: the time domain resource corresponding to the TCI state is determined by a predefined rule; or a mode 1-4: the time domain resource corresponding to the TCI state is determined by the number of continuous mini slots or slots corresponding to the TCI state.

In one embodiment, the determining, according to the time domain resource corresponding to the TCI state, the size of the time domain bundling specifically includes one of the following modes:

a mode 2-1: a maximum value M_max of the size M of the time domain bundling is predetermined; if the number of mini slots or slots on a section of continuous mini slots or slots corresponding to the TCI state is P and P≤M_max, M=P; and if P>M_max, M=M_max; or a mode 2-2: the network side assigns the maximum value M_max of the size M of the time domain bundling; if the number of mini slots or slots on a section of continuous mini slots or slots corresponding to the TCI state is P and P≤M_max, M=P; and if P>M_max, M=M_max.

In one embodiment, a precoding mode used on the time domain resource within the size of the time domain bundling is kept unchanged.

It should be noted that in the embodiments of the present application, division of the device is illustrative, and is only a logic function division, and there may be other division manners in actual implementation. In addition, functional devices in the embodiments of the present application may be integrated into one processing device, or each device may exist alone physically, or two or more devices are integrated into one device. The above integrated device may be implemented in the form of hardware, or may also be implemented in the form of a software functional device.

The integrated device, if implemented in the form of a software functional device and sold or used as a stand-alone product, may be stored in a computer readable storage medium. Based on such understanding, the embodiments of the present application essentially, or the part contributing to the prior art, or all or part of the embodiments may be embodied in the form of a software product. The software product is stored in a storage medium which includes several instructions for causing computer equipment (which may be a personal computer, a server, a network device, or the like) or a processor to execute all or part of the steps of the methods described in the embodiments of the present application. The aforementioned storage medium includes: a universal serial bus (USB) flash disk, a mobile hard disk, a read-only memory (ROM), a random access memory (RAM), a magnetic disk, an optical disk, or other various media to store program codes.

Embodiments of the present application provide computing equipment, which may specifically be a desktop computer, a portable computer, a smart phone, a tablet computer, a PDA, and the like. The computing equipment may include a CPU, a memory, input/output equipment, and the like; the input equipment may include a keyboard, a mouse, a touch screen, and the like; and the output equipment may include display equipment, such as a liquid crystal display (LCD) and a cathode ray tube (CRT).

A memory may include a ROM and a RAM, and provides the processor with program instructions and data stored in the memory. In the embodiments of the present application, the memory may be configured to store a program of any one of the methods provided in the embodiments of the present application.

A processor is configured to execute any method provided by the embodiments of the present application according to obtained program instructions by calling the program instructions stored in the memory.

Embodiments of the present application provide a computer storage medium for storing computer program instructions for the devices provided in the embodiments of the present application, which includes a program for executing any one of the methods provided in the embodiments of the present application.

The computer storage medium may be any available medium or data storage equipment that can be accessed by a computer, and includes but is not limited to a magnetic memory (such as a floppy disk, a hard disk, a magnetic tape and a magneto-optical disk (MO)), an optical memory (such as CD, DVD, BD and HVD), and a semiconductor memory (such as ROM, EPROM, EEPROM, a non-volatile memory (NAND FLASH) and a solid state disk (SSD)).

The methods provided by the embodiments of the present application may be applied to terminal equipment, and may also be applied to network equipment.

The terminal equipment may also be referred to as UE, a mobile station (called MS for short), a mobile terminal, or the like, and In one embodiment, the terminal may have a capability of communicating with one or more core networks via a radio access network (RAN), for example, the terminal may be a mobile phone (or referred to as a cell phone), a computer with mobile property, or the like, and for example, the terminal may also be a portable, pocket type, handheld, computer-embedded, or vehicle-mounted mobile device.

The network equipment may be a base station (such as an access point) that refers to equipment which communicates with a wireless terminal in an access network over an air interface through one or more sectors. The base station may be configured to interconvert received air frames and IP packets to serve as a router between the wireless terminal and the rest of the access network, and the rest of the access network may include an IP network. The base station may also coordinate attribute management for the air interface. For example, the base station may be a BTS in GSM or CDMA, NodeB in WCDMA, evolutional Node B (NodeB or eNB or e-NodeB) in LTE, or gNB in a 5G system, which is not limited in the embodiments of the present application.

The process flows of the foregoing methods may be implemented by a software program which may be stored in a storage medium, and when the stored software program is called, the steps of the foregoing method are performed.

To sum up, in the embodiments of the present application, through the TCI state and the time domain resource allocation, the same precoding is used on part of continuous time domain resources, and the terminal may perform joint channel estimation on the time domain resources. The embodiments of the present application specifically include: determining, in the time domain resource allocation and TCI state indication process, the correspondence between the TCI state and the mini slots or slots; and determining the size of the time domain bundling according to the above resource allocation and the TCI state indication. In the present application, in a TDM reliability enhancement scheme (scheme 3/4) based on multi-point transmission, the correspondence between the TCI state and the mini slots or slots may be determined, and the time domain bundling is supported.

The embodiments of the present application may be provided as a method, system, or computer program product. Accordingly, the present application may employ the form of an entirely hardware embodiment, an entirely software embodiment or an embodiment combining software and hardware. Furthermore, the present application may employ the form of a computer program product implemented on one or more computer-usable storage media (including, but not limited to, a disk memory, an optical memory, and the like) containing computer-usable program codes.

The present application is described with reference to flow diagrams and/or block diagrams of methods, equipment (systems), and computer program products according to the embodiments of the present application. It will be understood that each flow and/or block of the flow diagrams and/or block diagrams, and combinations of flows and/or blocks in the flow diagrams and/or block diagrams, can be implemented by computer program instructions. These computer program instructions may be provided to a general purpose computer, a special purpose computer, an embedded processor, or a processor of other programmable data processing equipment to produce a machine instructions, which are executed via the computer or the processor of other programmable data processing equipment, produce a device for implementing the functions specified in one or more flows in the flow diagrams and/or one or more blocks in the block diagrams.

These computer program instructions may also be stored in a computer-readable memory that can direct a computer or other programmable data processing equipment to work in a particular manner instructions stored in the computer-readable memory produce a manufactured product including an instruction device which implements the functions specified in one or more flows in the flow diagrams and/or one or more blocks in the block diagrams.

These computer program instructions may also be loaded onto a computer or other programmable data processing equipment to cause a series of operational steps to be performed on the computer or other programmable equipment to produce computer implemented processing the instructions which are executed on the computer or other programmable equipment provide steps for implementing the functions specified in one or more flows in the flow diagrams and/or one or more blocks in the block diagrams.

What is claimed is:

1. A resource determination method, comprising:
   determining a correspondence between a transmission configuration indication (TCI) state and a time domain resource; and
   determining, according to the correspondence, the time domain resource corresponding to the TCI state;
   wherein the time domain resource corresponding to the TCI state is determined by adopting one of: determining the time domain resource corresponding to the TCI state by a predefined pattern and corresponding pattern indication information; or determining the time domain resource corresponding to the TCI state by a predefined rule;
   wherein the determining the time domain resource corresponding to the TCI state by a predefined pattern and corresponding pattern indication information comprises:
   indicating or configuring a time domain repetition number to be N, wherein N is an integer greater than or equal to 1; and
   determining a correspondence between TCI states and mini slots or slots by the time domain repetition number and by indicating a sequence of TCI states through an index value; wherein a plurality of predefined patterns separately correspond to different sequences of TCI states; and each of the sequences of TCI states has a corresponding index value;
   or,
   wherein the determining the time domain resource corresponding to the TCI state by a predefined rule comprises:
   determining that a TCI state 0 corresponds to even numbered mini slots or slots, and a TCI state 1 corresponds to odd numbered mini slots or slots; or determining that a TCI state 0 corresponds to a first half of mini slots or slots, and a TCI state 1 corresponds to a second half of mini slots or slots.

2. The method according to claim 1, wherein the method further comprises: informing a terminal of the pattern indication information.

3. A non-transitory computer storage medium, wherein the computer storage medium stores a computer executable instruction, and the computer executable instruction is configured to enable a computer to execute the method according to claim 1.

4. A resource determination method, comprising:
  determining, according to a correspondence between a transmission configuration indication (TCI) state and a time domain resource, the time domain resource corresponding to the TCI state; and
  determining, according to the time domain resource corresponding to the TCI state, a size of time domain bundling;
  wherein the time domain resource corresponding to the TCI state is determined by adopting one of: determining the time domain resource corresponding to the TCI state by a predefined pattern and pattern indication information informed by a network side; or determining the time domain resource corresponding to the TCI state by a predefined rule;
  wherein the determining the time domain resource corresponding to the TCI state by a predefined pattern and pattern indication information informed by a network side comprises:
  determining a time domain repetition number indicated or configured by the network side to be N, wherein N is an integer greater than or equal to 1; and
  determining a correspondence between TCI states and mini slots or slots by the time domain repetition number and by a sequence of TCI states indicated through an index value;
  wherein a plurality of predefined patterns separately correspond to different sequences of TCI states; and each of the sequences of TCI states has a corresponding index value;
  or,
  wherein the determining the time domain resource corresponding to the TCI state by a predefined rule comprises:
  determining that a TCI state 0 corresponds to even numbered mini slots or slots, and a TCI state 1 corresponds to odd numbered mini slots or slots; or determining that a TCI state 0 corresponds to a first half of mini slots or slots, and a TCI state 1 corresponds to a second half of mini slots or slots.

5. The method according to claim 4, wherein the determining, according to the time domain resource corresponding to the TCI state, the size of time domain bundling specifically comprises one of:
  a mode 2-1: predetermining a maximum value M_max of the size M of the time domain bundling, wherein in a case that a quantity of mini slots or slots on a section of continuous mini slots or slots corresponding to the TCI state is P and P≤M_max, M=P; and in a case of P>M_max, M=M_max; or
  a mode 2-2: assigning a maximum value M_max of the size M of the time domain bundling by a network side, wherein in a case that a quantity of mini slots or slots on a section of continuous mini slots or slots corresponding to the TCI state is P and P≤M_max, M=P; and in a case of P>M_max, M=M_max.

6. The method according to claim 5, wherein a precoding mode used on the time domain resource within the size of the time domain bundling is kept unchanged.

7. The method according to claim 4, wherein a precoding mode used on the time domain resource within the size of the time domain bundling is kept unchanged.

8. A resource determination device, comprising:
  a memory, configured to store a program instruction; and
  a processor, configured to call the program instruction stored in the memory and execute the method according to claim 4.

9. The device according to claim 8, wherein the determining, according to the time domain resource corresponding to the TCI state, the size of the time domain bundling specifically comprises one of:
  a mode 2-1: predetermining a maximum value M_max of the size M of the time domain bundling, wherein in a case that a quantity of mini slots or slots on a section of continuous mini slots or slots corresponding to the TCI state is P and P≤M_max, M=P; and in a case of P>M_max, M=M_max; or
  a mode 2-2: assigning a maximum value M_max of the size M of the time domain bundling by a network side, wherein in a case that a quantity of mini slots or slots on a section of continuous mini slots or slots corresponding to the TCI state is P and P≤M_max, M=P; and in a case of P>M_max, M=M_max.

10. The device according to claim 9, wherein a precoding mode used on the time domain resource within the size of the time domain bundling is kept unchanged.

11. The device according to claim 8, wherein a precoding mode used on the time domain resource within the size of the time domain bundling is kept unchanged.

12. A non-transitory computer storage medium, wherein the computer storage medium stores a computer executable instruction, and the computer executable instruction is configured to enable a computer to execute the method according to claim 4.

13. A resource determination device, comprising:
  a memory, configured to store a program instruction; and
  a processor, configured to call the program instruction stored in the memory and execute following operations according to an obtained program:
  determining a correspondence between a transmission configuration indication (TCI) state and a time domain resource; and
  determining, according to the correspondence, the time domain resource corresponding to the TCI state;
  wherein the processor is configured to execute: determining the time domain resource corresponding to the TCI state by a predefined pattern and corresponding pattern indication information; or determining the time domain resource corresponding to the TCI state by a predefined rule;
  wherein the processor is further configured to execute:
  indicating or configuring a time domain repetition number to be N, wherein N is an integer greater than or equal to 1; and
  determining a correspondence between TCI states and mini slots or slots by the time domain repetition number and by indicating a sequence of TCI states through an index value;
  wherein a plurality of predefined patterns separately correspond to different sequences of TCI states; and each of the sequences of TCI states has a corresponding index value;
  or,
  wherein the processor is further configured to execute:
  determining that a TCI state 0 corresponds to even numbered mini slots or slots, and a TCI state 1 corresponds to odd numbered mini slots or slots; or a TCI state 0 corresponds to a first half of mini slots or slots, and a TCI state 1 corresponds to a second half of mini slots or slots.

14. The device according to claim 13, wherein the processor is further configured to call the program instruction stored in the memory, and execute informing a terminal of the pattern indication information according to an obtained program.

* * * * *